(12) United States Patent
Zhang

(10) Patent No.: US 9,235,052 B2
(45) Date of Patent: Jan. 12, 2016

(54) LASER FREQUENCY ADJUSTMENT METHOD AND LASER FREQUENCY ADJUSTMENT SYSTEM

(71) Applicant: Shenzhen China Star Optoelectronics Technology Co., Ltd., Shenzhen, Guangdong (CN)

(72) Inventor: Xiang Zhang, Shenzhen (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 110 days.

(21) Appl. No.: 14/126,433

(22) PCT Filed: Nov. 13, 2013

(86) PCT No.: PCT/CN2013/087012
§ 371 (c)(1),
(2) Date: Dec. 15, 2013

(87) PCT Pub. No.: WO2015/066939
PCT Pub. Date: May 14, 2015

(65) Prior Publication Data
US 2015/0131157 A1   May 14, 2015

(30) Foreign Application Priority Data
Nov. 13, 2013  (CN) .......................... 2013 1 0542956

(51) Int. Cl.
*G02B 27/14* (2006.01)
*G02B 27/09* (2006.01)

(52) U.S. Cl.
CPC ................................. *G02B 27/0927* (2013.01)

(58) Field of Classification Search
CPC ...... G02B 6/00; G02B 6/0055; G02B 6/0018; G02B 6/0028; G02B 6/2817; G02B 27/145; G02B 27/283; G02B 27/106; G02B 27/108; G02B 2027/0114
USPC ............ 359/584, 586, 588, 589, 629; 372/25, 372/70, 93, 99; 606/3, 10
See application file for complete search history.

(56) References Cited

U.S. PATENT DOCUMENTS 7,822,092 B2   10/2010   Ershov

FOREIGN PATENT DOCUMENTS

| FR | 2580122 A1 | 10/1986 |
| JP | 2005148549 A | 6/2005 |

*Primary Examiner* — Mahidere Sahle
(74) *Attorney, Agent, or Firm* — Andrew C. Cheng

(57) ABSTRACT

The present invention provides a laser frequency adjustment method and a laser frequency adjustment system. The laser frequency adjustment method includes: (1) providing a primitive laser pulse (10); (2) using a beam splitter (20) to split the primitive laser pulse (10) into a first sub-laser pulse (11) and a second sub-laser pulse (12); (3) using a plurality of reflectors (30) to reflect the first sub-laser pulse (11) to a location where the second sub-laser pulse (12) exits the beam splitter (20) and making the first sub-laser pulse (11) passing through an optical length extension device (40) during the transmission of the first sub-laser pulse (11); and (4) superimposing the first sub-laser pulse (11) and the second sub-laser pulse (12) and using a compensator sheet (50) to adjust the transmission direction of the superimposed laser pulse (13).

15 Claims, 4 Drawing Sheets

LASER FREQUENCY ADJUSTMENT METHOD AND LASER FREQUENCY ADJUSTMENT SYSTEM

BACKGROUND OF THE INVENTION

1. Field of the Invention

The present invention relates to flat panel displaying technology, and in particular to a laser frequency adjustment method and a laser frequency adjustment system.

2. The Related Arts

The displaying technology has been undergone fast development recently. A flat panel display device is significantly different from a traditional video image displaying device by adopting totally different displaying and manufacturing technology. The traditional video image displaying device is generally based on a cathode ray tube (CRT), from which a flat panel display device differs primarily concerning changes made in respect of weight and size (thickness). Generally, a flat panel display device has a thickness not greater than 10 centimeters, among the other differences associated with various technical aspects, such as theory of displaying, manufacturing material, manufacturing process, driving for displaying video images.

The flat panel display device possesses features such as being completely flattened, being light and thin, and energy saving and currently undergoes progresses toward high PPI (pixels per inch), low power consumption, and high integration. Amorphous silicon, which is conventionally used, due to inherent limitation, cannot suit the above described needs and poly-silicon is considered the best candidate for substituting amorphous silicon for poly-silicon is fit for the needs for future developments of the flat panel display device.

As links of the technical cores of the low temperature poly-silicon displaying technology, the manufacturing process and material behavior of poly-silicon determine the performance of a display device. The manufacturing processes of poly-silicon that are currently known include: low pressure chemical vapor deposition (LPCVD), solid phase crystallization, metal induction, and laser annealing. The most commonly used process in the industry is the laser annealing operation, which uses the high temperature generated by a laser beam to melt amorphous silicon for re-crystallization to form poly-silicon. Although adjusting parameters of the laser beam may better the result of crystallization, due to limitation imposed by the specifications of operation machines, parameters and the ranges thereof that can be modulated are limited, such as laser frequency, so that it is impossible to conduct more thorough study of the process of crystallization of poly-silicon and the result thereof.

As shown in FIG. 1, which is a schematic view showing an optical path of a laser pulse used in a prior-art laser annealing process, in the drawing, a primitive laser pulse 100 passes through a beam splitter 200 so that the primitive laser pulse 100 is split into two sub-laser pulses 101, 102. The energy of each of the sub-laser pulses 101, 102 is 50% of that of the primitive laser pulse 100. The sub-laser pulse 101 is subjected to reflection by four reflectors 300 to transmit back to the beam splitter 200 to be superimposed with the sub-laser pulse 102. Since the sub-laser pulses 101, 102, after passing through the beam splitter 200, shows a down-shifting distance in the vertical direction, a compensator sheet 400 is used to adjust the superimposed laser pulse 103 back to the original vertical position. During such a process, compared to the sub-laser pulse 102, the sub-laser pulse 101 has a longer transmission distance so as to show a time delay with respect to the sub-laser pulse 102. The sub-laser pulse 101 and the sub-laser pulse 102 are superimposed to eventually provide the laser pulse 104 illustrated in the drawing. Due to constraints imposed by the specifications of the operation machines, the four reflectors 300 shown in FIG. 1 are all fixed in position, which is not adjustable, so that the laser pulse 104 that is finally formed is fixed, making it not possible to further improve the process and result of crystallization of poly-silicon.

SUMMARY OF THE INVENTION

Thus, an object of the present invention is to provide a laser frequency adjustment method, which splits a primitive laser pulse into two sub-laser pulses and arranges an optical length extension device in the optical path of one of the sub-laser pulses to further expand the optical path difference between the two sub-laser pulses so as to form two clearly separate sub-laser pulses and finally superimposes the two to realize frequency adjustment of the laser.

Another object of the present invention is to provide a laser frequency adjustment system, which comprises an optical length extension device to increase the optical path length of sub-laser pulses so as to effectively widen the frequency range of laser pulses and to allow a substrate to receive more radiation of laser within the same period of time thereby bettering the result of crystallization of poly-silicon.

To achieve the objects, the present invention provides a laser frequency adjustment method, comprising the following steps:

(1) providing a primitive laser pulse;

(2) using a beam splitter to split the primitive laser pulse into a first sub-laser pulse and a second sub-laser pulse that are respectively transmitted in two directions;

(3) using a number of reflectors to reflect the first sub-laser pulse to the location where the second sub-laser pulse exits the beam splitter and making the first sub-laser pulse passing through an optical length extension device during the transmission of the first sub-laser pulse; and (4) the first sub-laser pulse, after reflected by the beam splitter, being in the same transmission direction as the second sub-laser pulse so as to be superimposed on the second sub-laser pulse and using a compensator sheet to adjust the transmission direction of a laser pulse formed through the superimposition.

The first sub-laser pulse is formed by a part of the primitive laser pulse reflected on a surface of the beam splitter and the second sub-laser pulse is formed by a part of the primitive laser pulse that transmits through the beam splitter and exits an opposite surface thereof, whereby energy ratios of the first sub-laser pulse and the second sub-laser pulse with respect to the primitive laser pulse are adjustable by adjusting reflectivity of the beam splitter.

Energy of the first sub-laser pulse is 50% of energy of the primitive laser pulse and energy of the second sub-laser pulse is 50% of the energy of the primitive laser pulse.

The optical length extension device comprises: optical crystal and high-transmittance antireflective layers respectively arranged at two ends of the optical crystal. The first sub-laser pulse enters the optical crystal through the high-transmittance antireflective layer of an end thereof and exits through the high-transmittance antireflective layer of another end of the optical crystal.

The optical crystal is an optical crystal that shows an electro-optic effect. The optical crystal has a refractive index that is greater than 3 for laser having a wavelength of 308 nm. The high-transmittance antireflective layers are made of $MgF_2$ or $Al_2O_3$.

The number of the reflectors is four, which are respectively first to fourth reflector, whereby the first sub-laser pulse exists the beam splitter and is then reflected by the first reflector to the third reflector, and then reflected by the third reflector to the optical length extension device and passing through the optical length extension device to reach the second reflector, and then reflected by the second reflector to the fourth reflector, so as to be reflected by the fourth reflector to project, at a predetermined angle, to the location where the second sub-laser pulse exits the beam splitter to be superimposed on the second sub-laser pulse.

The superimposition of the first sub-laser pulse and the second sub-laser pulse forms a laser pulse that is subjected to the adjustment by the compensator sheet to be set in the same transmission direction as the primitive laser pulse and at the same altitude.

The present invention also provides a laser frequency adjustment method, which comprises the following steps:

(1) providing a primitive laser pulse;

(2) using a beam splitter to split the primitive laser pulse into a first sub-laser pulse and a second sub-laser pulse that are respectively transmitted in two directions;

(3) using a number of reflectors to reflect the first sub-laser pulse to the location where the second sub-laser pulse exits the beam splitter and making the first sub-laser pulse passing through an optical length extension device during the transmission of the first sub-laser pulse; and (4) the first sub-laser pulse, after reflected by the beam splitter, being in the same transmission direction as the second sub-laser pulse so as to be superimposed on the second sub-laser pulse and using a compensator sheet to adjust the transmission direction of a laser pulse formed through the superimposition;

wherein the optical length extension device comprises: optical crystal and high-transmittance antireflective layers respectively arranged at two ends of the optical crystal, the first sub-laser pulse entering the optical crystal through the high-transmittance antireflective layer of an end thereof and exiting through the high-transmittance antireflective layer of another end of the optical crystal; and wherein the optical crystal is an optical crystal that shows an electro-optic effect, the optical crystal having a refractive index that is greater than 3 for laser having a wavelength of 308 nm, the high-transmittance antireflective layers being made of $MgF_2$ or $Al_2O_3$.

The first sub-laser pulse is formed by a part of the primitive laser pulse reflected on a surface of the beam splitter and the second sub-laser pulse is formed by a part of the primitive laser pulse that transmits through the beam splitter and exits an opposite surface thereof, whereby energy ratios of the first sub-laser pulse and the second sub-laser pulse with respect to the primitive laser pulse are adjustable by adjusting reflectivity of the beam splitter.

Energy of the first sub-laser pulse is 50% of energy of the primitive laser pulse and energy of the second sub-laser pulse is 50% of the energy of the primitive laser pulse.

The number of the reflectors is four, being respectively first to fourth reflector, whereby the first sub-laser pulse exists the beam splitter and is then reflected by the first reflector to the third reflector, and then reflected by the third reflector to the optical length extension device and passing through the optical length extension device to reach the second reflector, and then reflected by the second reflector to the fourth reflector, so as to be reflected by the fourth reflector to project, at a predetermined angle, to the location where the second sub-laser pulse exits the beam splitter to be superimposed on the second sub-laser pulse.

The superimposition of the first sub-laser pulse and the second sub-laser pulse forms a laser pulse that is subjected to the adjustment by the compensator sheet to be set in the same transmission direction as the primitive laser pulse and at the same altitude.

The present invention further provides a laser frequency adjustment system, which comprises:

an incidence port, a beam splitter, a number of reflectors, an optical length extension device, a compensator sheet, and an exit port, the beam splitter being arranged to correspond to the incidence port, the compensator sheet being arranged to correspond to the exit port, whereby a primitive laser pulse gets incident from the incidence port to the beam splitter and is split by the beam splitter into a first sub-laser pulse and a second sub-laser pulse that are respectively transmitted in two directions, the number of reflectors reflecting the first sub-laser pulse to reach, at a predetermined angle, the location where the second sub-laser pulse exits the beam splitter to be superimposed on the second sub-laser pulse and then subjected to adjustment of transmission direction by the compensator sheet to exit from the exit port, the optical length extension device being arranged on the optical path of transmission of the first sub-laser pulse.

The first sub-laser pulse is formed by a part of the primitive laser pulse reflected on a surface of the beam splitter and the second sub-laser pulse is formed by a part of the primitive laser pulse that transmits through the beam splitter and exits an opposite surface thereof, whereby energy ratios of the first sub-laser pulse and the second sub-laser pulse with respect to the primitive laser pulse are adjustable by adjusting reflectivity of the beam splitter, energy of the first sub-laser pulse being 50% of energy of the primitive laser pulse and energy of the second sub-laser pulse being 50% of the energy of the primitive laser pulse; and the optical length extension device comprising: optical crystal and high-transmittance antireflective layers respectively arranged at two ends of the optical crystal, the first sub-laser pulse entering the optical crystal through the high-transmittance antireflective layer of an end thereof and exiting through the high-transmittance antireflective layer of another end of the optical crystal, the optical crystal being an optical crystal that shows an electro-optic effect, the optical crystal having a refractive index that is greater than 3 for laser having a wavelength of 308 nm, the high-transmittance antireflective layers being made of $MgF_2$ or $Al_2O_3$.

The number of the reflectors is four, which are respectively first to fourth reflector, whereby the first sub-laser pulse exists the beam splitter and is then reflected by the first reflector to the third reflector, and then reflected by the third reflector to the optical length extension device and passing through the optical length extension device to reach the second reflector, and then reflected by the second reflector to the fourth reflector, so as to be reflected by the fourth reflector to project, at a predetermined angle, to the location where the second sub-laser pulse exits the beam splitter to be superimposed on the second sub-laser pulse.

The efficacy of the present invention is that the present invention provides a laser frequency adjustment method and a laser frequency adjustment system, wherein a primitive laser pulse is split into two sub-laser pulses and an optical length extension device is arranged on an optical path of one of the sub-laser pulses to expand an optical path difference between the two sub-laser pulses to provide two clearly separate sub-laser pulses, and finally, the two are superimposed in order to realize adjustment of laser frequency. Further, since the optical length extension device shows an electro-optic effect that is an optical effect of high speed and low power consumption so that a real time adjustment of time delay between the two sub-laser pulses can be realized through variation of waveform of a voltage applied thereto thereby achieving dynamical adjustment of the time delay between the two sub-laser pulses. Thus, the present invention enables effectively widening the frequency range of a laser and allows a substrate to receive more irradiation of laser within the same period of time thereby bettering the result of crystallization of poly-silicon.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

The present invention makes improvement in respect of frequency parameters of a laser pulse as a link of a laser annealing process in order to expand the range of frequency adjustability thereby enhancing the crystallization result of poly-silicon. The present invention is realized through such a way that with a laser pulse passing through a beam splitter and split into two sub-laser pulses, an optical length extension (OLEX) device is arranged on an optical path of one of the sub-laser pulses to further expand the optical path difference of the two sub-laser pulses so that the two sub-laser pulses can be more clearly distinguished from each other after passing through the beam splitter, whereby frequency adjustment of the laser pulse can be realized through superimposition of the two sub-laser pulses to well cope with the issue that in the prior art, due to the constraints imposed by the specifications of operation machines, further adjustment of the parameters of laser pulses is not possible and thus thorough study of the process and result of crystallization of poly-silicon is not available.

Figure 2:
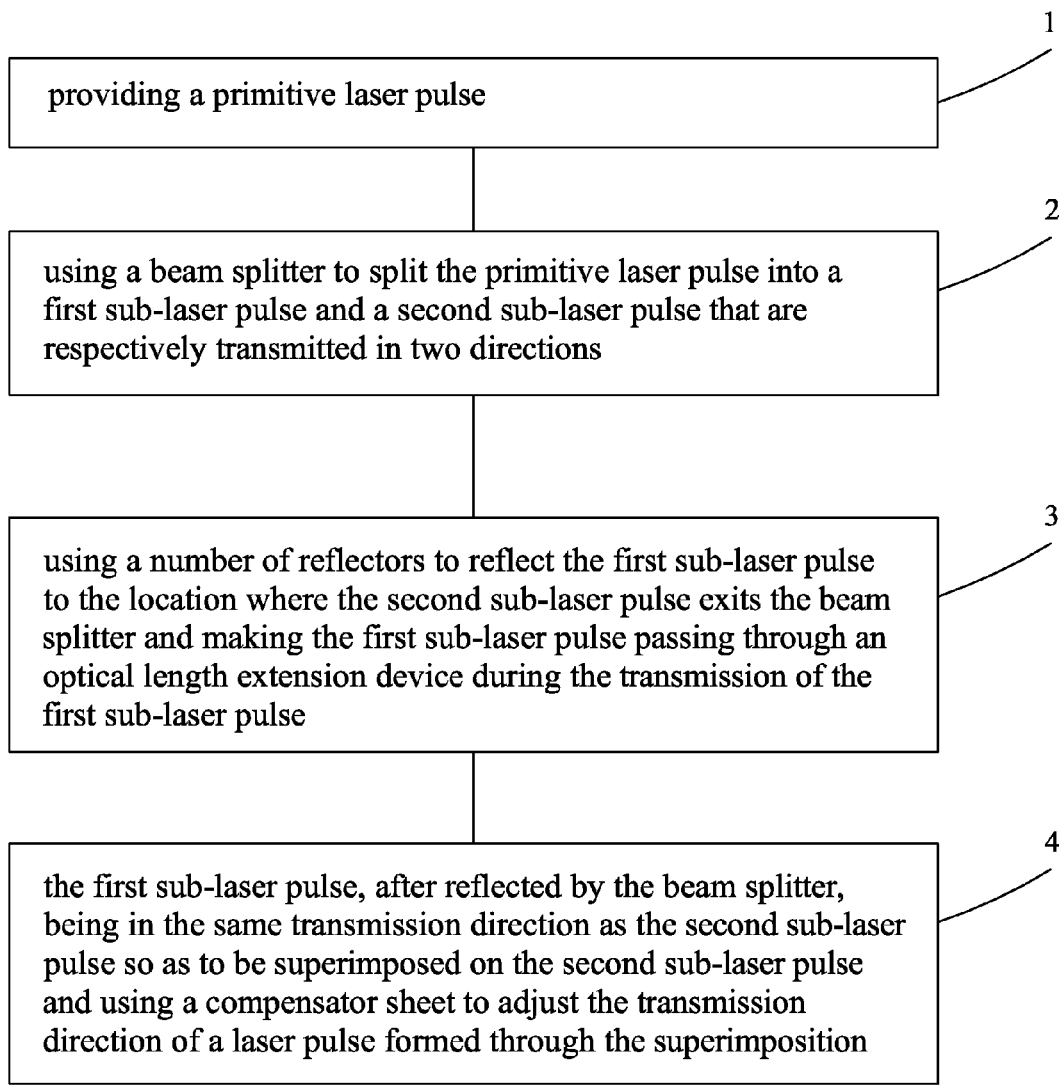
FIG. 2 is a flow chart illustrating a laser frequency adjustment method according to the present invention.
Figure 3:
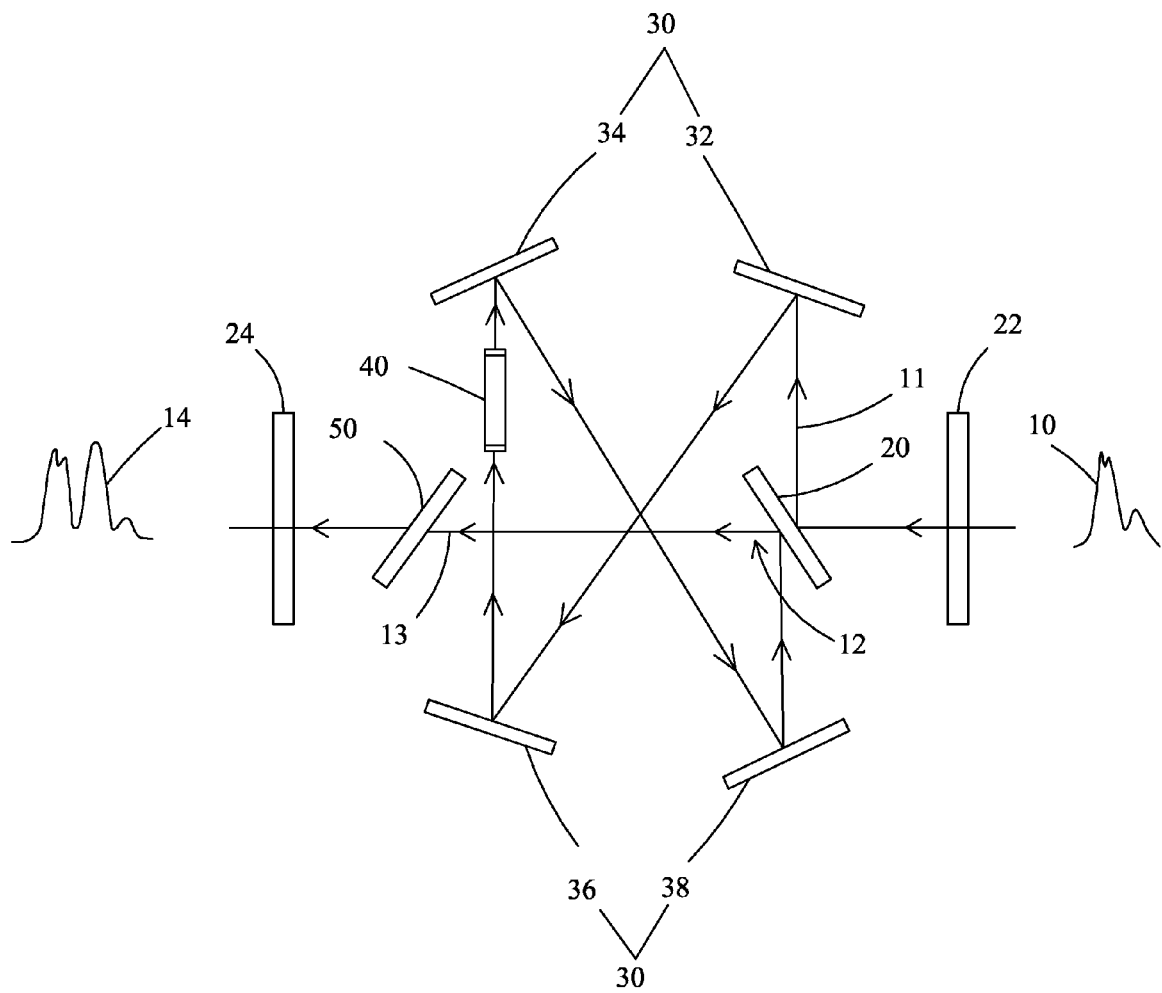
FIG. 3 is a schematic view showing an optical path of a laser pulse of a laser frequency adjustment system according to the present invention.
Figure 4:
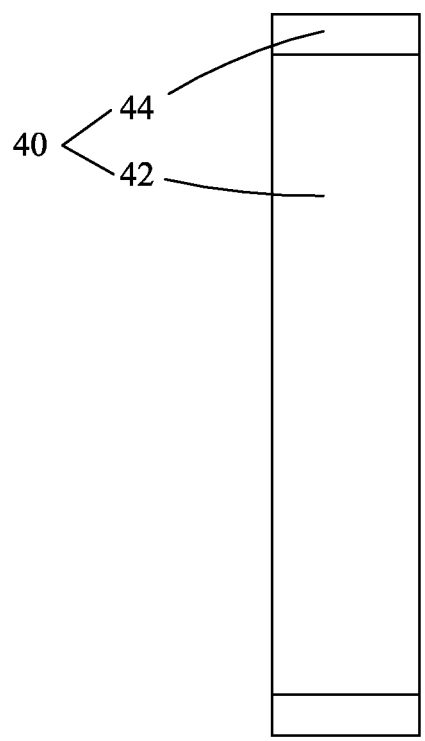
FIG. 4 is a schematic view showing the structure of an optical length extension device according the present invention.

Referring to FIGS. 2-4, the present invention provides a laser frequency adjustment method, which specifically comprises the following steps:

Step 1: providing a primitive laser pulse 10.

The primitive laser pulse 10 can be used in a laser annealing process for manufacturing poly-silicon. Preferably, the primitive laser pulse 10 is of a wavelength of 308 nm.

Step 2: using a beam splitter (BS) 20 to split the primitive laser pulse 10 into a first sub-laser pulse 11 and a second sub-laser pulse 12 that are respectively transmitted in two directions.

The first sub-laser pulse 11 is formed by a part of the primitive laser pulse 10 reflected on a surface of the beam splitter 20, while the second sub-laser pulse 12 is formed by a part of the primitive laser pulse 10 that transmits through the beam splitter 20 and exits an opposite surface thereof. Thus, the ratios of energy of the first sub-laser pulse 11 and the second sub-laser pulse 12 with respect to the primitive laser pulse 10 can be adjusted by adjusting the reflectivity of the beam splitter 20. In the instant embodiment, the energy of the first sub-laser pulse 11 is 50% of the energy of the primitive laser pulse 10 and the energy of the second sub-laser pulse 12 is 50% of the energy of the primitive laser pulse 10.

Step 3: using a plurality of reflectors 30 to reflect the first sub-laser pulse 11 to the location where the second sub-laser pulse 12 exits the beam splitter 20 and making the first sub-laser pulse 11 passing through an optical length extension device 40 during the transmission of the first sub-laser pulse 11.

In the instant embodiment, the optical length extension device 40 comprises: a piece of optical crystal 42 and high-transmittance antireflective layers 44 respectively arranged at two ends of the optical crystal 42. The first sub-laser pulse 11 enters the optical crystal 42 through the high-transmittance antireflective layer 44 of an end thereof and exits through the high-transmittance antireflective layer 44 of another end of the optical crystal 42. Since the optical crystal 42 has a refractive index (N value) that is greater than the refractive index of air, after the first sub-laser pulse 11 passes through the optical length extension device 40, the relative time delay between the first sub-laser pulse 11 and the second sub-laser pulse 12 is further extended so that the originally existing coincidence condition becomes two clearly separate sub-laser pulses, providing a condition for realization of frequency doubling of the laser pulse.

The mechanism of the laser annealing process is relatively complicated and different time intervals of laser pulses may cause different effects on the final result of annealing. To increase the flexibility of adjustment of the manufacturing process to further enhance the effect of the laser annealing, in the present invention, the optical crystal 42 of the optical length extension device 40 is not a conventionally used fixed-refractive-index optical crystal and, instead, an optical crystal 42 that shows an electro-optic effect is used (where the electro-optic effect is an effect that under an electrical field, the dielectric constant of the crystal, namely the refractive index thereby may vary), so that through variation of an electrical voltage applied across the two ends of the optical crystal 42, adjustment of the refractive index can be realized. Since the refractive index of the optical crystal 42 is changeable, the optical path distance that the first sub-laser pulse 11 passes in the transmission thereof can be varied to thereby dynamically adjust the time delay between the first sub-laser pulse 11 and the second sub-laser pulse 12. Further, since the electro-optic effect is an optical effect of high speed and low power consumption, it is possible to achieve real time adjustment of the time delay of the first sub-laser pulse 11 and the second sub-laser pulse 12 by adjusting the waveform of the voltage applied.

Further, the criterion for selection of the optical crystal 42 is that for laser having a wavelength of 308 nm, the refractive index thereof is preferably greater than 3 and the extinction coefficient (K value) is as small as possible.

Further, to reduce loss of the first sub-laser pulse 11 in the transmission thereof, the high-transmittance antireflective layers 44 are preferably made of $MgF_2$ or $Al_2O_3$.

Figure 1:
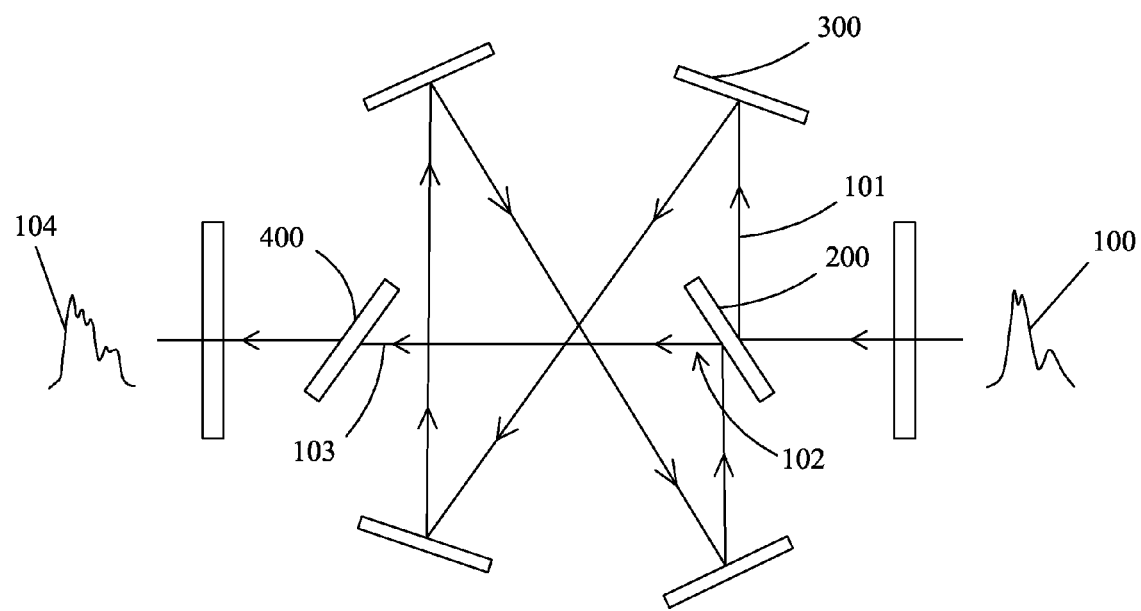
FIG. 1 is a schematic view showing an optical path of a laser pulse used in a prior-art laser annealing process.

In the instant embodiment, the reflectors 30 are of a number of four, which are respectively first to fourth reflectors 32, 34, 36, 38. The four reflectors 30 are arranged at such locations as to ensure the first sub-laser pulse 11 can be projected, at a predetermined angle, toward the location where the second sub-laser pulse 12 exits the beam splitter 20 and can be arranged at the same locations as those of the four reflectors (the reflectors 300 of FIG. 1) used in the prior art. The optical length extension device 40 is arranged between the second and third reflectors 34, 36. The optical path of transmission of the first sub-laser pulse 11 is as follows. The first sub-laser pulse 11 exists the beam splitter 20 and is then reflected by the first reflector 32 to the third reflector 36, and then reflected by the third reflector 36 to the optical length extension device 40 and passing through the optical length extension device 40 to reach the second reflector 34, and then reflected by the second reflector 34 to the fourth reflector 38, so as to be reflected by the fourth reflector 38 to project, at a predetermined angle, to the location where the second sub-laser pulse 12 exits the beam splitter 20 to be further reflected by the beam splitter 20 to further transmit in the same direction as the second sub-laser pulse 12 passing through the beam splitter 20 thereby superimposed on the second sub-laser pulse 12.

As an alternative, the present invention allows for arrangement of multiple optical length extension devices 40 on the transmission optical path of the first sub-laser pulse 11 in order to further expand the optical path difference of the first sub-laser pulse 11 and the second sub-laser pulse 12. The multiplicity of optical length extension devices 40 can be of identical length or of different lengths and a specific arrangement can be made according to the distance between two reflectors 30 with the locations where the optical length extension devices 40 not affecting the optical path (meaning the first sub-laser pulse 11 may propagate in exactly the same path as that of the prior art).

Step 4: the first sub-laser pulse 11, after reflected by the beam splitter 20, being in the same transmission direction as the second sub-laser pulse 12 so as to be superimposed on the second sub-laser pulse 12 and using a compensator sheet (CP) 50 to adjust the transmission direction of a laser pulse 13 formed through the superimposition.

The first sub-laser pulse 11 and the second sub-laser pulse 12 are superimposed through the above descried process so that it is possible to realize frequency doubling of the laser pulse and is also possible to dynamically adjust the time delay between the sub-laser pulses, thereby providing conditions for the study of bettering the process and result of crystallization of poly-silicon through laser annealing.

After being adjusted by the compensator sheet 50, the laser pulse of the superimposition of the first sub-laser pulse 11 and the second sub-laser pulse 12 is set in the same transmission direction and located at the same altitude as the primitive laser pulse 10, as shown in FIG. 3.

Referring to FIGS. 3 and 4, the present invention also provides a laser frequency adjustment system, which comprises: an incidence port 22, an exit port 24, a beam splitter 20, a compensator sheet 50, a plurality of reflectors 30, and an optical length extension device 40. The beam splitter 20 is arranged to correspond to the incidence port 22 and the compensator sheet 50 is arranged to correspond to the exit port 24. A primitive laser pulse 10 gets incident from the incidence port 22 to the beam splitter 20 and is split by the beam splitter 20 into a first sub-laser pulse 11 and a second sub-laser pulse 12 that are respectively transmitted in two directions. The plurality of reflector 30 reflects the first sub-laser pulse 11 to reach, at a predetermined angle, the location where the second sub-laser pulse 12 exits the beam splitter 20 to be superimposed on the second sub-laser pulse 12 and then subjected to adjustment of transmission direction by the compensator sheet 50 to exit from the exit port 24. The optical length extension device 40 is arranged on the optical path of transmission of the first sub-laser pulse 11.

The primitive laser pulse 10 can be used in a laser annealing process for manufacturing poly-silicon. Preferably, the primitive laser pulse 10 is of a wavelength of 308 nm. The first sub-laser pulse 11 is formed by a part of the primitive laser pulse 10 reflected on a surface of the beam splitter 20, while the second sub-laser pulse 12 is formed by a part of the primitive laser pulse 10 that transmits through the beam splitter 20 and exits an opposite surface thereof. Thus, the ratios of energy of the first sub-laser pulse 11 and the second sub-laser pulse 12 with respect to the primitive laser pulse 10 can be adjusted by adjusting the reflectivity of the beam splitter 20. In the instant embodiment, the energy of the first sub-laser pulse 11 is 50% of the energy of the primitive laser pulse 10 and the energy of the second sub-laser pulse 12 is 50% of the energy of the primitive laser pulse 10.

In the instant embodiment, the optical length extension device 40 comprises: a piece of optical crystal 42 and high-transmittance antireflective layers 44 respectively arranged at two ends of the optical crystal 42. The first sub-laser pulse 11 enters the optical crystal 42 through the high-transmittance antireflective layer 44 of an end thereof and exits through the high-transmittance antireflective layer 44 of another end of the optical crystal 42. The criterion for selection of the optical crystal 42 is that for laser having a wavelength of 308 nm, the refractive index thereof is preferably greater than 3 and the extinction coefficient (K value) is as small as possible. Since the optical crystal 42 has a refractive index (N value) that is greater than the refractive index of air, after the first sub-laser pulse 11 passes through the optical length extension device 40, the relative time delay between the first sub-laser pulse 11 and the second sub-laser pulse 12 is further extended so that the originally existing coincidence condition becomes two clearly separate sub-laser pulses, providing a condition for realization of frequency doubling of the laser pulse.

In the instant embodiment, the reflectors 30 are of a number of four, which are respectively first to fourth reflectors 32, 34, 36, 38. The four reflectors 30 are arranged at such locations as to ensure the first sub-laser pulse 11 can be projected, at a predetermined angle, toward the location where the second sub-laser pulse 12 exits the beam splitter 20 and can be arranged at the same locations as those of the four reflectors (the reflectors 300 of FIG. 1) used in the prior art. The optical length extension device 40 is arranged between the second and third reflectors 34, 36. The optical path of transmission of the first sub-laser pulse 11 is as follows. The first sub-laser pulse 11 exists the beam splitter 20 and is then reflected by the first reflector 32 to the third reflector 36, and then reflected by the third reflector 36 to the optical length extension device 40 and passing through the optical length extension device 40 to reach the second reflector 34, and then reflected by the second reflector 34 to the fourth reflector 38, so as to be reflected by the fourth reflector 38 to project, at a predetermined angle, to the location where the second sub-laser pulse 12 exits the beam splitter 20 to be further reflected by the beam splitter 20 to further transmit in the same direction as the second sub-laser pulse 12 passing through the beam splitter 20 thereby superimposed on the second sub-laser pulse 12.

As an alternative, the present invention allows for arrangement of multiple optical length extension devices 40 on the transmission optical path of the first sub-laser pulse 11 in order to further expand the optical path difference of the first sub-laser pulse 11 and the second sub-laser pulse 12. The multiplicity of optical length extension devices 40 can be of identical length or of different lengths and a specific arrangement can be made according to the distance between two reflectors 30 with the locations where the optical length extension devices 40 not affecting the optical path (meaning the first sub-laser pulse 11 may propagate in exactly the same path as that of the prior art).

In summary, the present invention provides a laser frequency adjustment method and a laser frequency adjustment system, wherein a primitive laser pulse is split into two sub-laser pulses and an optical length extension device is arranged on an optical path of one of the sub-laser pulses to expand an optical path difference between the two sub-laser pulses to provide two clearly separate sub-laser pulses, and finally, the two are superimposed in order to realize adjustment of laser frequency. Further, since the optical length extension device shows an electro-optic effect that is an optical effect of high speed and low power consumption so that a real time adjustment of time delay between the two sub-laser pulses can be realized through variation of waveform of a voltage applied thereto thereby achieving dynamical adjustment of the time delay between the two sub-laser pulses. Thus, the present invention enables effectively widening the frequency range of a laser and allows a substrate to receive more irradiation of laser within the same period of time thereby bettering the result of crystallization of poly-silicon.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A laser frequency adjustment method, comprising the following steps:
   (1) providing a primitive laser pulse;
   (2) using a beam splitter to split the primitive laser pulse into a first sub-laser pulse and a second sub-laser pulse that are respectively transmitted in two directions;
   (3) using a number of reflectors to reflect the first sub-laser pulse to the location where the second sub-laser pulse exits the beam splitter and making the first sub-laser pulse passing through an optical length extension device during the transmission of the first sub-laser pulse; and
   (4) the first sub-laser pulse, after reflected by the beam splitter, being in the same transmission direction as the second sub-laser pulse so as to be superimposed on the second sub-laser pulse and using a compensator sheet to adjust the transmission direction of a laser pulse formed through the superimposition, wherein the first and second sub-laser pulses, after being superimposed, are spaced from each other by an interval to form two separate sub-laser pulses to achieve frequency adjustment.

2. The laser frequency adjustment method as claimed in claim 1, wherein the first sub-laser pulse is formed by a part of the primitive laser pulse reflected on a surface of the beam splitter and the second sub-laser pulse is formed by a part of the primitive laser pulse that transmits through the beam splitter and exits an opposite surface thereof, whereby energy ratios of the first sub-laser pulse and the second sub-laser pulse with respect to the primitive laser pulse are adjustable by adjusting reflectivity of the beam splitter.

3. The laser frequency adjustment method as claimed in claim 2, wherein energy of the first sub-laser pulse is 50% of energy of the primitive laser pulse and energy of the second sub-laser pulse is 50% of the energy of the primitive laser pulse.

4. The laser frequency adjustment method as claimed in claim 1, wherein the optical length extension device comprises: optical crystal and high-transmittance antireflective layers respectively arranged at two ends of the optical crystal, the first sub-laser pulse entering the optical crystal through the high-transmittance antireflective layer of an end thereof and exiting through the high-transmittance antireflective layer of another end of the optical crystal.

5. The laser frequency adjustment method as claimed in claim 4, wherein the optical crystal is an optical crystal that shows an electro-optic effect, the optical crystal having a refractive index that is greater than 3 for laser having a wavelength of 308 nm, the high-transmittance antireflective layers being made of $MgF_2$ or $Al_2O_3$.

6. The laser frequency adjustment method as claimed in claim 1, wherein the number of the reflectors is four, being respectively first to fourth reflector, whereby the first sub-laser pulse exists the beam splitter and is then reflected by the first reflector to the third reflector, and then reflected by the third reflector to the optical length extension device and passing through the optical length extension device to reach the second reflector, and then reflected by the second reflector to the fourth reflector, so as to be reflected by the fourth reflector to project, at a predetermined angle, to the location where the second sub-laser pulse exits the beam splitter to be superimposed on the second sub-laser pulse.

7. The laser frequency adjustment method as claimed in claim 1, wherein the superimposition of the first sub-laser pulse and the second sub-laser pulse forms a laser pulse that is subjected to the adjustment by the compensator sheet to be set in the same transmission direction as the primitive laser pulse and at the same altitude.

8. A laser frequency adjustment method, comprising the following steps:
   (1) providing a primitive laser pulse;
   (2) using a beam splitter to split the primitive laser pulse into a first sub-laser pulse and a second sub-laser pulse that are respectively transmitted in two directions;
   (3) using a number of reflectors to reflect the first sub-laser pulse to the location where the second sub-laser pulse exits the beam splitter and making the first sub-laser pulse passing through an optical length extension device during the transmission of the first sub-laser pulse; and
   (4) the first sub-laser pulse, after reflected by the beam splitter, being in the same transmission direction as the second sub-laser pulse so as to be superimposed on the second sub-laser pulse and using a compensator sheet to adjust the transmission direction of a laser pulse formed through the superimposition, wherein the first and second sub-laser pulses, after being superimposed, are spaced from each other by an interval to form two separate sub-laser pulses to achieve frequency adjustment;
   wherein the optical length extension device comprises: optical crystal and high-transmittance antireflective layers respectively arranged at two ends of the optical crystal, the first sub-laser pulse entering the optical crystal through the high-transmittance antireflective layer of an end thereof and exiting through the high-transmittance antireflective layer of another end of the optical crystal; and
   wherein the optical crystal is an optical crystal that shows an electro-optic effect, the optical crystal having a refractive index that is greater than 3 for laser having a wavelength of 308 nm, the high-transmittance antireflective layers being made of $MgF_2$ or $Al_2O_3$.

9. The laser frequency adjustment method as claimed in claim 8, wherein the first sub-laser pulse is formed by a part of the primitive laser pulse reflected on a surface of the beam splitter and the second sub-laser pulse is formed by a part of the primitive laser pulse that transmits through the beam splitter and exits an opposite surface thereof, whereby energy ratios of the first sub-laser pulse and the second sub-laser pulse with respect to the primitive laser pulse are adjustable by adjusting reflectivity of the beam splitter.

10. The laser frequency adjustment method as claimed in claim 9, wherein energy of the first sub-laser pulse is 50% of energy of the primitive laser pulse and energy of the second sub-laser pulse is 50% of the energy of the primitive laser pulse.

11. The laser frequency adjustment method as claimed in claim 8, wherein the number of the reflectors is four, being respectively first to fourth reflector, whereby the first sub-laser pulse exists the beam splitter and is then reflected by the first reflector to the third reflector, and then reflected by the third reflector to the optical length extension device and passing through the optical length extension device to reach the second reflector, and then reflected by the second reflector to the fourth reflector, so as to be reflected by the fourth reflector to project, at a predetermined angle, to the location where the second sub-laser pulse exits the beam splitter to be superimposed on the second sub-laser pulse.

12. The laser frequency adjustment method as claimed in claim 8, wherein the superimposition of the first sub-laser pulse and the second sub-laser pulse forms a laser pulse that is subjected to the adjustment by the compensator sheet to be set in the same transmission direction as the primitive laser pulse and at the same altitude.

13. A laser frequency adjustment system, comprising: an incidence port, a beam splitter, a number of reflectors, an optical length extension device, a compensator sheet, and an exit port, the beam splitter being arranged to correspond to the incidence port, the compensator sheet being arranged to correspond to the exit port, whereby a primitive laser pulse gets incident from the incidence port to the beam splitter and is split by the beam splitter into a first sub-laser pulse and a second sub-laser pulse that are respectively transmitted in two directions, the number of reflectors reflecting the first sub-laser pulse to reach, at a predetermined angle, the location where the second sub-laser pulse exits the beam splitter to be superimposed on the second sub-laser pulse and then subjected to adjustment of transmission direction by the compensator sheet to exit from the exit port, the optical length extension device being arranged on the optical path of transmission of the first sub-laser pulse, wherein the first and second sub-laser pulses, after being superimposed, are spaced from each other by an interval to form two separate sub-laser pulses to achieve frequency adjustment.

14. The laser frequency adjustment system as claimed in claim 13, wherein the first sub-laser pulse is formed by a part of the primitive laser pulse reflected on a surface of the beam splitter and the second sub-laser pulse is formed by a part of the primitive laser pulse that transmits through the beam splitter and exits an opposite surface thereof, whereby energy ratios of the first sub-laser pulse and the second sub-laser pulse with respect to the primitive laser pulse are adjustable by adjusting reflectivity of the beam splitter, energy of the first sub-laser pulse being 50% of energy of the primitive laser pulse and energy of the second sub-laser pulse being 50% of the energy of the primitive laser pulse; and the optical length extension device comprising: optical crystal and high-transmittance antireflective layers respectively arranged at two ends of the optical crystal, the first sub-laser pulse entering the optical crystal through the high-transmittance antireflective layer of an end thereof and exiting through the high-transmittance antireflective layer of another end of the optical crystal, the optical crystal being an optical crystal that shows an electro-optic effect, the optical crystal having a refractive index that is greater than 3 for laser having a wavelength of 308 nm, the high-transmittance antireflective layers being made of $MgF_2$ or $Al_2O_3$.

15. The laser frequency adjustment system as claimed in claim 13, wherein the number of the reflectors is four, being respectively first to fourth reflector, whereby the first sub-laser pulse exists the beam splitter and is then reflected by the first reflector to the third reflector, and then reflected by the third reflector to the optical length extension device and passing through the optical length extension device to reach the second reflector, and then reflected by the second reflector to the fourth reflector, so as to be reflected by the fourth reflector to project, at a predetermined angle, to the location where the second sub-laser pulse exits the beam splitter to be superimposed on the second sub-laser pulse.

* * * * *